May 23, 1961 R. J. KOUPAL 2,985,308
FILTER ELEMENT AND SYSTEM
Filed Jan. 6, 1958 2 Sheets-Sheet 1

May 23, 1961 R. J. KOUPAL 2,985,308
FILTER ELEMENT AND SYSTEM
Filed Jan. 6, 1958 2 Sheets-Sheet 2

United States Patent Office 2,985,308
Patented May 23, 1961

2,985,308

FILTER ELEMENT AND SYSTEM

Robert J. Koupal, Tucson, Ariz., assignor to Infilco Incorporated, Tucson, Ariz., a corporation of Delaware Filed Jan. 6, 1958, Ser. No. 707,424

2 Claims. (Cl. 210—169)

This invention relates to filters of the type wherein a bed or coat of filter-aid material, such as diatomaceous earth, is deposited on a permeable support or element. Such filters are known in the art, and, therefore, sometimes referred to herein, as "diatomite filters." It should, however, be understood that the term "diatomite filter" is used herein in a generic sense without limitation to any particular filter construction or filter-aid material.

The invention relates to an improved diatomite element, and particularly to a filter element including a fabric bag whose internal surface serves as the support for the filter-aid material.

It is an object of this invention to provide an improved diatomite filter having a simplified and economical construction.

Another object of this invention is to provide a diatomite filter element having a fabric bag employing internal surfaces for the deposit of the diatomite bed.

A further object of the invention is to provide a diatomite filter element adapted for direct installation in open top containers or basins such as a swimming pool, a municipal water supply reservoir, a cooling tower basin, or a plating bath, and eliminating the need for a filter casing.

Another object is to provide a portable filter element adapted to be placed into open top containers or basins which do not have liquid inlet or outlet connections.

A further object is to provide a relatively inexpensive mobile filter.

Other objects will become apparent upon consideration of the detailed description and of the claims which follow.

A diatomite filter usually includes a plurality of filter elements each of which comprises a rigid, permeable core which may serve as the filter element proper or as a foundation for various types of supporting surfaces for the coat of filter-aid material, such as, for example, a fabric bag drawn over the core. Such elements are supported in a casing in such a manner that the liquid to be filtered, entering the casing, can reach the casing outlet only by passing through the filter elements from the outside of the fabric bag and the core to the interior thereof. Usually the elements are supported from a partition or plate which extends across the casing, divides the casing into an inlet chamber for liquid to be filtered on its one side and a filtered liquid outlet chamber on its other side, and is provided with ports. The elements extend into the inlet chamber and register with the ports. The core, partition and casing must be made of a relatively sturdy material, such as steel, to withstand the high pressure differential which exists between the inlet and outlet chamber of such filters.

My invention eliminates the need for rigid, permeable element cores, casings and partitions while retaining the advantages of using a fabric bag as the supporting surface for the coat of filter-aid material.

The invention will be more readily understood from consideration of the drawings which form a part hereof, and wherein similar elements in the several figures are designated by similar reference characters.

Figure 2:
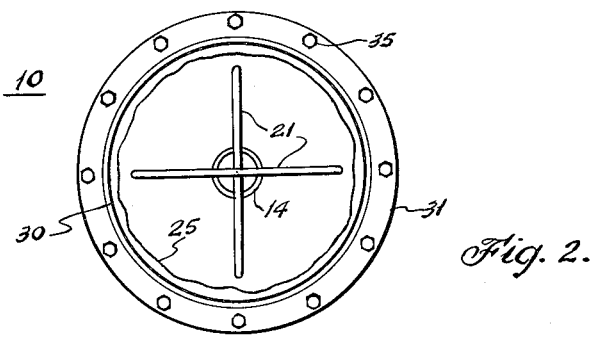
Figure 2 is a horizontal cross sectional view taken along the line 2—2 of Figure 1.
Figure 1:
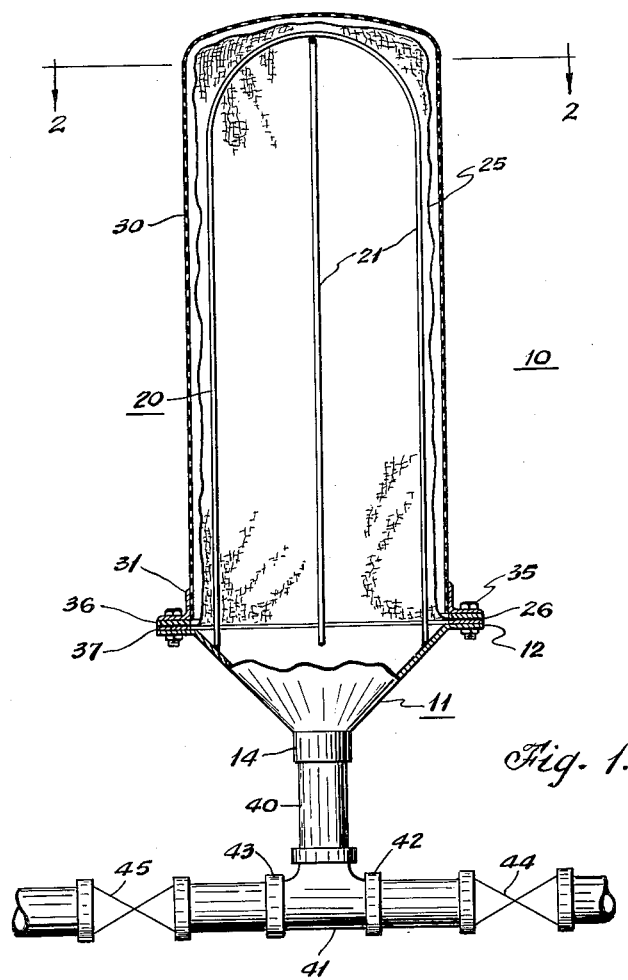
Figure 1 is a vertical cross sectional view, partly in elevation, of a filter element according to the invention.

Referring to Figure 1, the filter element 10 includes a frusto conical base portion 11 having an annular flange 12, and a tubular member 14 which may be fabricated as a unit or which may be made by welding the individual parts together. A rigid element which may be in the shape of a wire helix, or, as shown in the drawings, a cage 20 comprising equally spaced struts 21, is mounted on the base 11 and may be affixed thereto in any suitable manner, as by welding.

A fabric bag 25 having a closed top and an open bottom is drawn over the element or cage 20. The lower portion of the bag 25 may extend through the base portion 11 into the tubular member 14, to which it can be secured by any suitable means, such as an expansion ring; or, as shown in Figure 1, it may have an annular flange portion 26 encircling its open lower end. The flange portion 26 may be an integral part of the bag 25 or may be a separate piece affixed thereto by sewing or in any other suitable manner. Over the bag 25 a substantially cylindrical basket 30 is placed whose inside circumference and height is the same as the outside circumference and height of the bag 25. When it is not under pressure, the bag 25 will droop away from the basket 30, as shown in Figure 1; however, when pressure is applied inside the bag 25 it comes into contact with, and is supported by, the basket 30. The basket 30 may be made of either a rigid, coarsely porous material, such as a 6 or 8 mesh wire cloth, or of a flexible material such as a coarsely porous plastic or woven material having sufficient strength to support the bag 25 when a considerable pressure is applied to its inside. The basket 30 has an open bottom and an L-shaped annular flange 31 affixed thereto by any suitable means, not shown.

The flanges 12, 26 and 31 of the base 11, the bag 25 and the basket 30, respectively, are clamped tightly together by a plurality of bolts and nuts 35. Gaskets 36 and 37 are inserted between the flange 26 of the bag 25 and the flanges 12 and 31, respectively, and assure a fluid tight seal so that fluid entering the base 11 through the tubular member 14 can leave the filter element 10 only by passing through the bag 25.

A nipple 40 connects the tubular member 14 with one port of a T-shaped pipe fitting 41. The inlet branch 42 and the outlet branch 43 of the fitting 41 are controlled by means of an inlet valve 44 and a drain valve 45, respectively.

Figure 3:
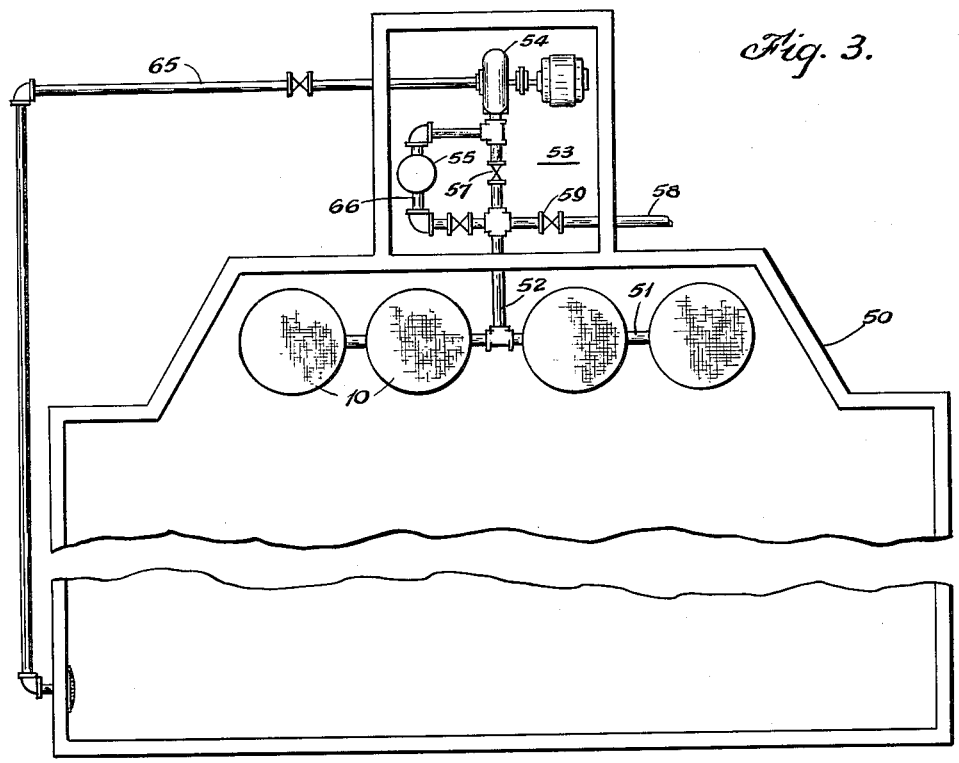
Figure 3 is a plan view schematically showing a plurality of filter elements according to the invention installed in a swimming pool and utilized for filtering the pool water.

Figure 3 shows diagrammatically the installation of a plurality of elements 10 in an open tank. The elements 10 are mounted a few feet below the normal liquid level in a basin 50 which may be a swimming pool. The filter elements 10 are connected in parallel to a common header 51. A pipe 52 branches off the header 51 and extends through a wall of the basin 50 into a chamber 53 which houses a pump 54 and a filter-aid feeder 55. The pipe 52 is connected to the discharge side of the pump 54. A filter inlet valve 57 controls flow through pipe 52.

A drain line 58 branches off the pipe 52 between the valve 57 and the header 51 and extends through the wall of the chamber 53 to a suitable drain. A drain valve 59 controls flow through line 58.

A conduit 65 connects the basin 50 to the suction side of the pump 54. The feeder 55 is connected in a valved shunt 66 leading from pipe 52 upstream of valve 57 and returning to pipe 52 downstream of the valve.

During filtering the drain valve 59 is closed, the filter inlet valve 57 is opened and the pump 54 is put into operation and pumps a liquid to be filtered, such as water, from the basin 50, through pipe 52 and header 51 into and through the filter elements 10. The filter inlet valve 57 creates sufficient backpressure to cause a small flow of water through the filter-aid feeder 55. As the water passes through the individual filter elements 10, a coat of filter-aid material builds up on the inner surface of the bags 25 (Figure 1) through which the water filters. As the water is pumped through the bags 25, the bags extend to their full dimensions and come into contact with the baskets 30 which support the bags 25 and prevent damage to them by the high pressure differential prevailing between the inside and the outside of the bags.

The filter elements 10 are backwashed by closing the filter inlet valve 57 and opening the drain valve 59. Water in the basin 50 then flows by gravity in a reverse direction through the walls of the bags 25 and through the drain line 58 to waste. This reverse flow of water causes the bags 25 to collapse somewhat suddenly around their cages 20. This sudden collapse throws off the cake of filter-aid and dirt from the inner surface of the bags 25. The cages 20 maintain the bags in partially extended positions so that the reverse flow of water will more efficiently clean the bags than would be the case if the bags collapsed completely. This gravity method of backwashing the filter elements 10 may be employed with a minimum of approximately three feet of water above the elements. When the available head is less than about three feet, the elements may be backwashed by using the pump 54 to draw water through them in a manner to be hereinafter explained.

It will be obvious that separate inlet and drain headers could be used and each element 10 be connected thereto in the manner shown in Figure 1, and be provided with its own inlet and drain valves. By so doing, any one filter element 10 could be cleaned or removed for repairs without disturbing the operation of the other filter elements.

Figure 4:
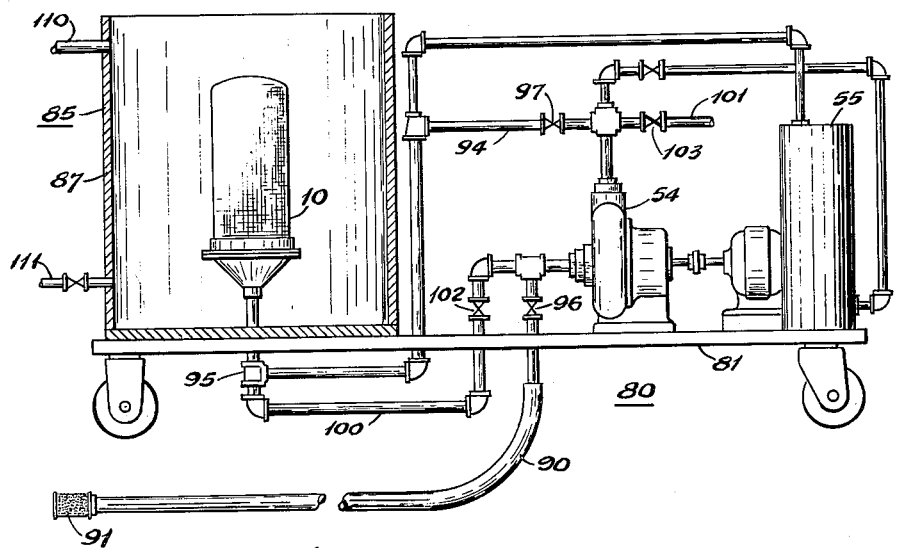
Figure 4 is an elevational view, partly in section, of a mobile filter unit according to the invention.

In construction and military camps and civilian defense retreats which are not permanent, it is desirable to have a readily available filter capable of furnishing purified water immediately when the camp or retreat is set up and movable to another location when the camp is broken or the retreat is abandoned. The embodiment of the invention shown in Figure 4 is well adapted for incorporation in a mobile purification unit, such as unit 80 with its carriage 81 upon which the filter 85, a pump, such as 54 of Figure 3, and a filter-aid feeder, such as 55 of Figure 3, are mounted.

The filter 85 includes a filter tank or casing 87 in which one or more elements 10 may be mounted by any suitable means, not shown. The top of tank 87 can be open, as shown, as no pressure filteration takes place. The tank 87 serves as a receiving basin for the effluent from the filter element 10.

The water to be filtered arrives through a raw water inlet conduit 90 which may be either rigid piping or the flexible conduit shown in the drawing. The conduit 90 carries a screen 91 at one end and leads to the suction side of the pump 54. The water to be filtered is introduced into the filter through a filter inlet conduit 94 connecting the discharge side of the pump 54 to the inlet 95 of the filter 85. A raw water inlet valve 96 controls flow through the inlet conduit 90 and a filter inlet valve 97 controls flow through the filter inlet conduit 94.

Backwash water is pumped from tank 87 through a backwash conduit 100 leading from the drain opening of filter 85 to the suction side of the pump 54 and is discharged to waste through a drain conduit 101 leading from a T-connection on the inlet conduit 94 upstream of the valve 97. A backwash valve 102 controls flow through the backwash conduit 100 and a drain valve 103 controls flow through the drain conduit 101.

The filter-aid feeder 55 is connected, as in Figure 3, in a shunt leading from the T-connection on the inlet conduit 94 and returning to conduit 94 downstream of the inlet valve 97.

During filtering the backwash valve 102 and the drain valve 103 are closed. The filter inlet valve 97 and the raw water inlet valve 96 are opened. When the pump 54 is operated, water filters through the filter element 10 into the tank 87. The filtered water may leave the tank 87 through an overflow 110 for use or storage in any suitable container, or if there is an intermittent demand for the filtered water, the tank 87 may serve as the storage container. In this case a valved outlet 111 would be provided through which the water may be withdrawn from the tank 87, as required. When the filtered water is stored in the tank 87, the water may be kept clean and fresh by recirculating it through the filter 10. This is accomplished by placing the screened end of the raw water inlet conduit 90 in the tank 87 and operating the pump while valves 96 and 97 are open and valves 102 and 103 are closed.

In this embodiment of the invention the filter element 10 is not backwashed by a gravity flow, as described in connection with the embodiment of Figure 3, but by pumping clean water through the element 10 in a reverse direction. This is accomplished by closing the filter inlet valve 97 and the raw water inlet valve 96, opening the backwash valve 102 and the drain valve 103 and putting the pump 54 in operation, which draws the water from the tank 87 through the filter element 10 and out the drain conduit 101 to waste.

Where the liquid to be filtered is contained in a small, open basin the tank 87 may be dispensed with and the filter element 10 together with its associated inlet and drain fittings may be placed as in Figure 3 directly in the basin which, in this instant, as in the embodiment of Figure 3, serves both as a source of raw water and as a casing for the filter element 10.

By using flexible hoses for the filter inlet conduit 94 and the backwash conduit 100, these conduits could be hung over the side of the basin and connected to the filter inlet and drain fittings inside the basin. The flexible hose 90 would also be hung with its screened end into the basin.

Such a mobile filter unit 80 may be used for example for cleaning electroplating baths. Where a series of electroplating tanks are arranged in a row, the mobile unit 80 can be moved into proximity with the electroplating tanks. The filter element 10 with its associated flexible conduits, and the raw water inlet conduit 90 could then be moved from tank to tank without moving the mobile unit 80, or disconnecting any piping.

It will be obvious that various modifications of the embodiment of the invention shown and described for purposes of illustration can be made without departing from the spirit and scope of the invention. It should, therefore, be understood that I do not wish to limit myself to the exact structural details of the device shown herein for purposes of illustration, but not of limitation.

I claim:

1. Means for filtering contaminated liquid in a swimming pool, comprising a flexible liquid pervious filter bag mounted in a lower portion of said swimming pool, submerged in and in hydraulic communication with the pool over substantially its entire surface, liquid pervious support means encompassing said bag and supporting said bag when it is distended under filtering pressure, a cage within said bag, said cage being sufficiently smaller than said bag to permit said bag to assume a partially collapsed position but prevent its total collapse and supporting it in said partially collapsed position under backwash pressure, a pump having its suction side connected to a portion of said swimming pool remote from said filter bag, means for admixing filter aid material with the liquid pumped by said pump, means for selectively connecting said bag to the discharge side of said pump to cause a flow of contaminated liquid from said swimming pool under pressure into said bag and through said bag directly back into said swimming pool, and deposit of said filter aid material on the inner surface of said bag, and for disconnecting said bag from said discharge side of said pump and connecting it to atmospheric pressure to cause liquid from said swimming pool to flow by gravity into said bag and wash the filter aid material off said bag, and means for withdrawing said wash flow and washed off filter aid material and filtered out contaminants from said bag.

2. In a swimming pool a filter comprising a flexible liquid pervious filter bag mounted in a lower portion of said pool, submerged directly in the liquid of and in hydraulic communication with said pool over substantially its entire surface, liquid pervious supporting means encompassing said bag and being of substantially the same size and shape as said bag, so that said bag rests against said supporting means and filtered liquid is freely discharged from said bag into said pool under filtering pressure, a cage within said bag and being sufficiently smaller than said bag to permit said bag to assume a partially collapsed position and supporting said bag in said partially collapsed position under backwash pressure, inlet means for liquid to be filtered discharging into the lower portion of said bag, and wash water outlet means from the lower portion of said bag, a pump having its suction side connected to a portion of the pool remote from said filter bag, means for adding filter aid material to the liquid pumped by said pump, means for connecting said bag through said inlet means to the discharge side of said pump to cause a flow of liquid to be filtered under pressure into and through said bag and into said pool, and means for connecting said bag through said outlet means to atmospheric pressure to cause a gravity flow of liquid from said pool into said bag and through said outlet means, said filter aid material being deposited on the inner surface of said bag by said pressure flow and washed off said surface by said gravity flow.

References Cited in the file of this patent

UNITED STATES PATENTS

| | | |
|---|---|---|
| 1,352,961 | Hills | Sept. 14, 1920 |
| 1,585,246 | Hoy | May 18, 1926 |
| 2,041,763 | Heckman | May 26, 1936 |
| 2,044,096 | Moran | June 16, 1936 |
| 2,100,951 | Glass | Nov. 30, 1937 |
| 2,423,172 | Booth | July 1, 1947 |
| 2,570,131 | Koupal | Oct. 2, 1951 |
| 2,760,644 | Nelson | Aug. 28, 1956 |
| 2,792,943 | Mackintosh | May 21, 1957 |
| 2,851,164 | Morino | Sept. 9, 1958 |
| 2,878,938 | Dee | Mar. 24, 1959 |

UNITED STATES PATENT OFFICE
CERTIFICATE OF CORRECTION

Patent No. 2,985,308

May 23, 1961

Robert J. Koupal

It is hereby certified that error appears in the above numbered patent requiring correction and that the said Letters Patent should read as corrected below.

Column 1, line 24, after "diatomite" insert -- filter --.

Signed and sealed this 7th day of November 1961.

(SEAL)
Attest:

ERNEST W. SWIDER
Attesting Officer

DAVID L. LADD
Commissioner of Patents

USCOMM-DC